United States Patent
Kynast et al.

(10) Patent No.: US 7,050,791 B2
(45) Date of Patent: May 23, 2006

(54) METHOD AND DEVICE FOR MANAGING MOBILE TELEPHONE MESSAGES

(75) Inventors: Andreas Kynast, Hildesheim (DE); Joerg Plumeier, Salzgitter (DE)

(73) Assignee: Robert Bosch GmbH, Stuttgart (DE)

( * ) Notice: Subject to any disclaimer, the term of this patent is extended or adjusted under 35 U.S.C. 154(b) by 329 days.

(21) Appl. No.: 10/181,588

(22) PCT Filed: Jan. 11, 2001

(86) PCT No.: PCT/DE01/00077

§ 371 (c)(1),
(2), (4) Date: Nov. 12, 2002

(87) PCT Pub. No.: WO01/54436

PCT Pub. Date: Jul. 26, 2001

(65) Prior Publication Data

US 2003/0100292 A1    May 29, 2003

(30) Foreign Application Priority Data

Jan. 19, 2000  (DE) .............................. 100 02 030

(51) Int. Cl.
*H04Q 7/20* (2006.01)
(52) U.S. Cl. ................. 455/412.1; 455/412.2
(58) Field of Classification Search ............ 455/412.1, 455/412.2, 423, 466, 558; 709/206, 207
See application file for complete search history.

(56) References Cited

U.S. PATENT DOCUMENTS

| | | | | |
|---|---|---|---|---|
| 5,239,679 A * | 8/1993 | Murai | ....................... | 340/7.52 |
| 5,258,751 A * | 11/1993 | DeLuca et al. | ............. | 340/7.52 |
| 5,999,932 A * | 12/1999 | Paul | ............................. | 707/10 |
| 6,023,723 A * | 2/2000 | McCormick et al. | ........ | 709/206 |
| 6,161,020 A * | 12/2000 | Kim | ........................... | 455/466 |
| 6,169,882 B1 * | 1/2001 | Amma | ....................... | 340/7.52 |
| 6,421,709 B1 * | 7/2002 | McCormick et al. | ........ | 709/206 |
| 6,615,241 B1 * | 9/2003 | Miller et al. | ................. | 709/206 |
| 6,654,787 B1 * | 11/2003 | Aronson et al. | ............ | 709/206 |

FOREIGN PATENT DOCUMENTS

| | | |
|---|---|---|
| EP | 0 752 793 | 1/1997 |
| EP | 0 982 959 | 3/2000 |
| WO | 99/13667 | 3/1999 |
| WO | 99/51048 | 10/1999 |
| WO | 99/57927 | 11/1999 |

* cited by examiner

*Primary Examiner*—William Trost
*Assistant Examiner*—James D Ewart
(74) *Attorney, Agent, or Firm*—Kenyon & Kenyon LLP

(57) ABSTRACT

Mobile radio communication messages transmitted by a message service to a terminal are linked to reference information items and tested in the terminal according to validity criteria. The messages are only stored in a non-volatile memory when they are valid; and they are not stored when they are invalid, and/or they are erased from the nonvolatile memory after having been previously stored when they are later determined to be invalid.

5 Claims, 1 Drawing Sheet

METHOD AND DEVICE FOR MANAGING MOBILE TELEPHONE MESSAGES

FIELD OF THE INVENTION

The present invention relates to a method and a device for managing mobile radio communication messages.

BACKGROUND INFORMATION

Smart cards are used as subscriber identity modules (SIM) in mobile equipment. In addition to identifying and authorizing the network subscriber, the smart-card module assumes, inter alia, the role of a portable data storage unit for, e.g. call numbers or short messages in the form of text. These short messages are transmitted by the so-called Short Message Service (SMS) and may include up to 160 characters.

As an alternative, the short messages may also be stored in the terminal, but then the advantage of using them in different terminals together with the smart card module is lost.

Since the non-volatile storage space on the smart card module is limited (<16 ... 32 kByte) and various other data and functions are stored in this memory, the number of short messages that may be saved in this smart card module is limited. It normally lies in the range of approximately 10 to 20. In contrast to the smart card module, there is indeed no technology-dependent upper limits for the size of the memory of the terminal, but even in this case, the economical configuration of the resources of the terminal will lead to limiting the amount of memory for the short messages. In both the smart card module and the terminal, the user has to manually delete the short messages no longer needed when the memory is completely full. A time-consuming sequence of operations is usually required to accomplish this.

Value-added services such as traffic and travel information or mobile banking (account statement) have been offered for some time, in particular by SMS. In connection with such services, the number of short messages received will markedly increase in the future and therefore require increased action on the part of the user to delete short messages.

Since no action by the user is necessary for receiving a short message, the memory may also be filled without the user initially noticing it. In addition, the user may miss perfectly desirable short messages, since no additional message may be received when the memory is completely full.

SUMMARY OF THE INVENTION

The present invention may allow the messages stored in the terminal or smart card module to be managed in an automated manner, and thus substantially relieves the user of the manual management. Since messages that do not satisfy the predefined validity criteria are deleted or not stored in the first place, the unchecked total occupation of the nonvolatile memory is prevented, which means that the user does not miss any newly received messages due to a full memory. The deletion of messages may also be used to obtain a better overall view of the messages to be looked at.

In addition, the management of the messages may also include sorting them, which means that the messages may also be saved and/or displayed according to sorting criteria, e.g. according to priority, and therefore, they become easier for the user to monitor. The most important or most recent message may be displayed at the top position in the display field.

Temporal information, spatial information, and information about the source, the content, or the importance of the message may be used as reference information, and as validity criteria and/or sorting criteria. This may allow the messages to be managed in a highly intelligent and user-friendly manner, which may also be adapted to personal wishes and then renders subsequent, manual intervention in the management largely unnecessary.

Thus, there may be general and personal priorities for managing the messages. For example, the importance may belong to the general priorities for traffic information. Emergency messages such as "Danger, person driving in the wrong direction" have a higher priority than warning messages such as "Fog formation". The personal priorities may be made up of the personal preferences of the user. Thus, sports reports may be more important to one user than stock exchange reports, while the reverse is true for another user.

The messages in the terminal may be managed by the terminal itself, by the smart card module, or even in a remote-controlled manner, via the mobile radio network. The latter alternative particularly presents itself to general priorities. Thus, the priority of traffic information, e.g. during major events, may be increased in this region.

An exemplary embodiment of the present invention is represented in the drawings and explained in the following description.

DETAILED DESCRIPTION

Figure 1:
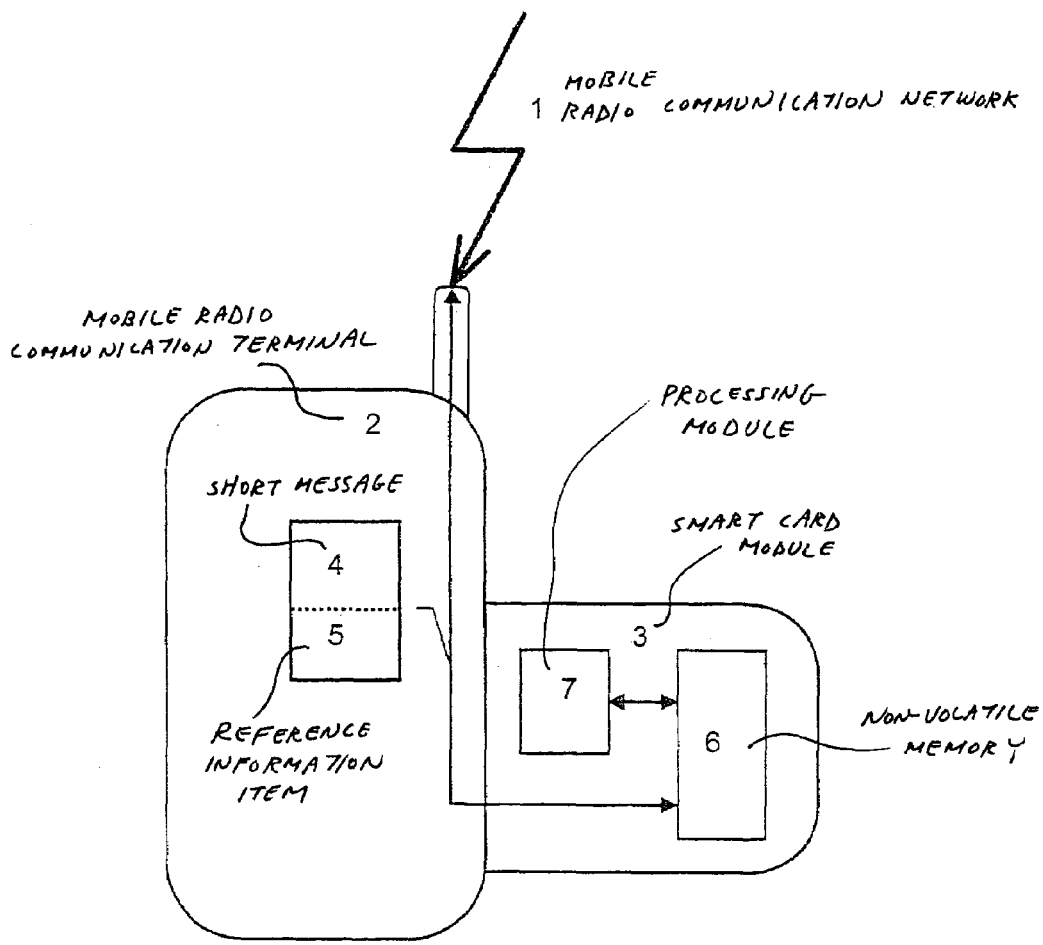
FIG. 1 is a schematic representation of a mobile radio communication terminal having functional blocks.

FIG. 1 shows a mobile radio communication terminal 2, which is inscribed in a mobile radio communication network 1 and receives a short message 4. A smart card module 3, which contains a nonvolatile memory 6, is plugged into a mount fixture of mobile radio communication terminal 2. This nonvolatile memory 6 is suitable for storing short messages.

In the exemplary embodiment, short message 4 is not generally stored in nonvolatile memory 6, but only after passing a test of its validity. In order to render this test, a reference information item 5 is transmitted as a part of the short message, or as an addition to it. A processing module 7 interprets and tests this reference information 5, using a validity criterion. If the validity criterion is satisfied, then the short message 4 including reference information item 5 is stored in nonvolatile memory 6. It may also be provided that short messages 4 previously stored are examined in intervals or in response to the occurrence of events. If the validity criterion is then not satisfied, then the short message 4 in question is automatically removed from nonvolatile memory 6.

Figure 2:
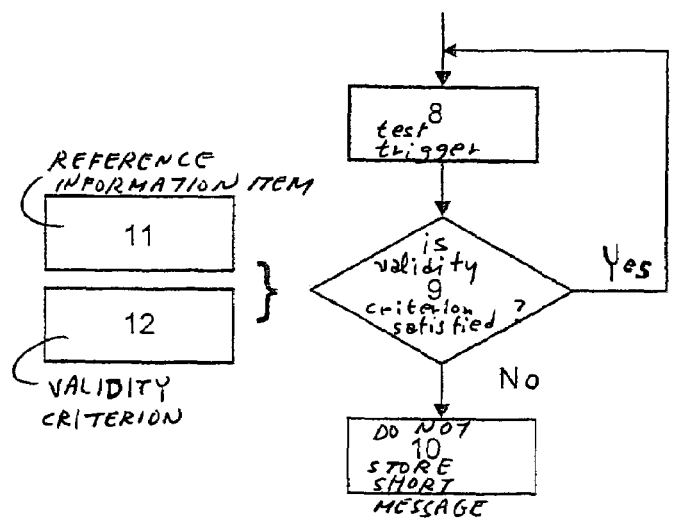
FIG. 2 is a flowchart of the management.

FIG. 2 shows a flowchart of the management. A time requirement or the occurrence of an event gives rise to a test trigger 8, which triggers a validity test 9 of the received or stored short message. In this case, a reference information item 11, which is a part of the short message, is compared to a validity criterion 12. If validity criterion 12 is satisfied, then the short message is valid, is stored, and is later reexamined when test trigger 8 is activated. If the validity criterion 12 is not fulfilled, then the short message is invalid and is not stored or, if previously stored, erased from memory 10. In addition to a validity criterion 12, a sorting criterion, which controls the allocation to memory locations or to positions on a display field, may also be provided.

The validity/sorting criterion may be a temporal reference, e.g. time frame or limit, a spatial reference, e.g. a prefix plus area code or mobile radio cell, or the presence or absence of other short messages in the memory.

The temporal reference may be linked to a temporal reference information item in the short message, or to the receiving time of the short messages, e.g. "automatically delete all short messages that are more than one week old".

The spatial reference may be a cell or a list of cells. To this end, the smart card module may extract from the terminal the information as to which cell the terminal is situated in. However, the spatial reference may also be a prefix plus area code of the corresponding fixed network region, e.g. 05121 for Hildesheim, a list of area codes, or a group of area codes (e.g. 05* for all area codes that begin with 05). Other information such as cities, regions, e.g. Harz or Weserbergland, or states, is also conceivable by performing the appropriate conversion in the terminal or smart card module, but is more complicated.

The test of the criteria may also be triggered as a function of time, e.g. "every two hours", spatially triggered, e.g. "during each change of cells", triggered by events, e.g. "when the memory is full and a new short message is received", or triggered by combination of these. An automated validity test of all short messages by an action of the user, e.g. "delete all short messages that are invalid", is conceivable.

The validity test/sorting may take place directly in the unit, namely the terminal or the smart card module, in which the short messages are stored. However, it may also be performed by the terminal for the smart card module, or by the smart card module for the terminal. It is also conceivable for the validity test, i.e. the selective deletion of a group of short messages, to be triggered via the mobile radio network.

What is claimed is:

1. A method for managing at least one mobile radio communication message transmitted to a terminal and linked to at least one reference information item, the method comprising:

testing the at least one mobile radio communication message in the terminal according to a validity criteria;

storing the at least one mobile radio communication message in a non-volatile memory if the at least one mobile radio communication is valid, but not if it is invalid;

erasing a previously stored mobile radio communication message from the nonvolatile memory when it is later determined to be invalid; and according to sorting criteria, performing at least one of:

assigning the at least one mobile radio communication message to a memory location in the nonvolatile memory;

deleting the at least one mobile radio communication message from the memory location in the nonvolatile memory;

assigning the at least one mobile radio communication message to a position in a display field of the terminal; and deleting the at least one mobile radio communication message from the position in the display field of the terminal;

wherein:

the at least one reference information item includes at least one of temporal information, spatial information, content information about the at least one mobile radio communication message, and information about a degree of importance;

at least one of the validity criteria and the sorting criteria includes at least one of a temporal criterion, a spatial criterion, a source criterion, a content criterion and an importance criterion;

the temporal information includes one of a generation time, a sending time, a receiving time, an independently specifiable time, and an independently specifiable time frame;

the spatial information includes one of state information, region information, location information, origin information of the at least one mobile radio communication message, and source information of the at least one mobile radio communication message;

the temporal criterion includes one of a time frame and a time limit;

the spatial criterion includes one of state information, region information, location information, and in a form of uncoded text, a contraction, an area code, or an identifier of a cell;

the source criterion includes one of a name, an address and a telephone number; and the content criterion includes one of a presence and an absence of one of at least one specifiable character, at least one numerical sequence, and at least one word.

2. The method of claim 1, wherein the at least one mobile radio communication message includes a short message.

3. The method of claim 1, wherein the testing according to the validity criteria is at least one of triggered as a function of time, by at least one event, and by remote-control via a mobile radio network.

4. The method of claim 1, wherein at least one of the terminal and a smart card module performs the testing according to the validity criteria.

5. The method of claim 1, wherein the storing is done in at least one of a nonvolatile memory arranged in the terminal and a nonvolatile memory arranged in a smart card module.

* * * * *